May 8, 1934.   H. RABEZZANA   1,957,801
SPARK PLUG TESTING DEVICE
Filed Nov. 30, 1931
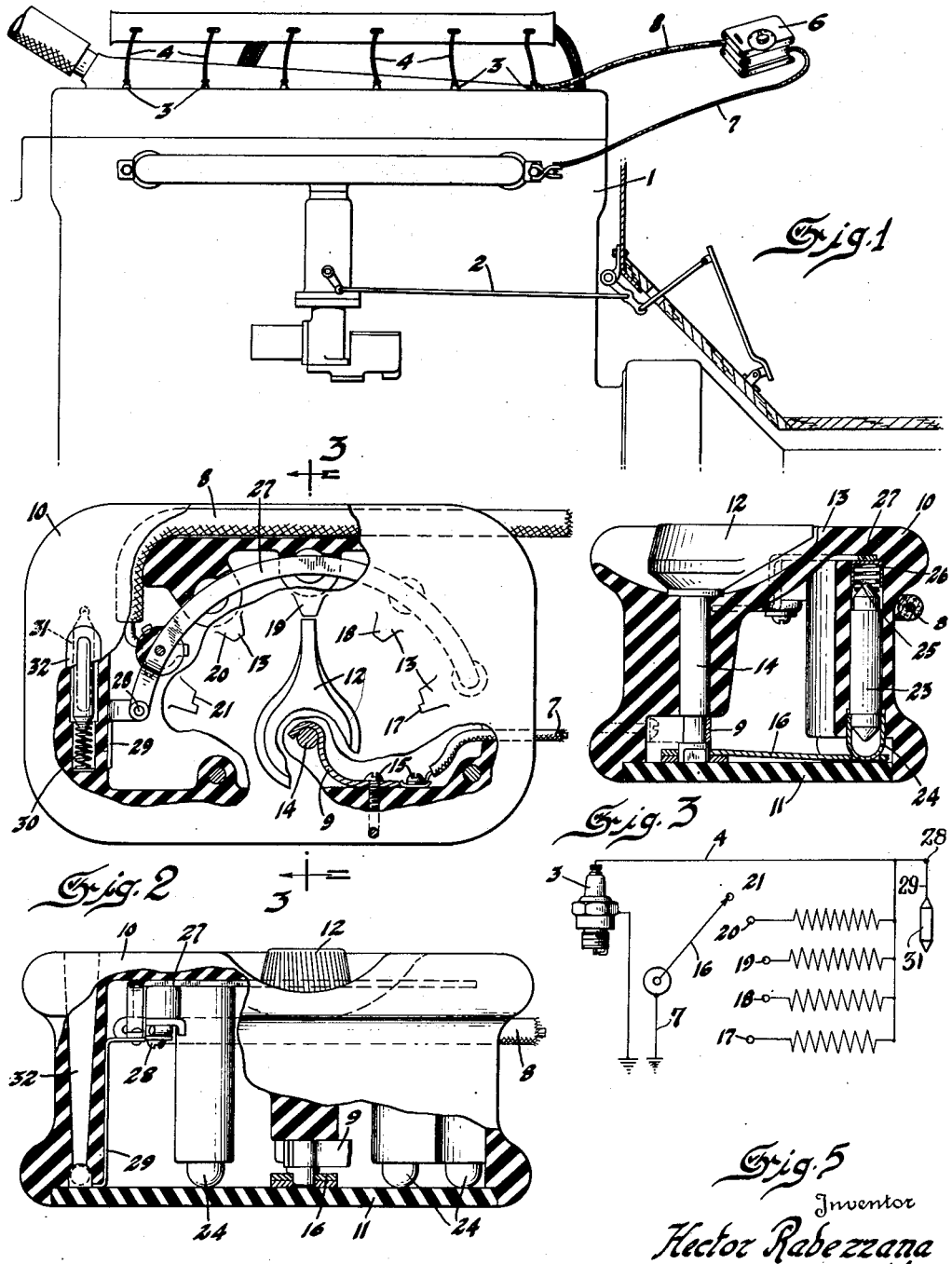
Inventor
Hector Rabezzana
By Blackmore, Spencer & Flint
Attorney Patented May 8, 1934

1,957,801

UNITED STATES PATENT OFFICE 1,957,801

SPARK PLUG TESTING DEVICE

Hector Rabezzana, Flint, Mich., assignor to A C Spark Plug Company, Flint, Mich., a company of Michigan Application November 30, 1931, Serial No. 577,947

16 Claims. (Cl. 175—183)

This invention relates to indicator devices and more particularly to an instrument and method for testing the efficiency or condition of a spark plug in the ignition circuit of an internal combustion engine.

In the operation of an engine, loss of power, irregular firing and lack of economy are often directly attributable to the bad condition of the spark plugs. Correction of the condition sometimes requires replacement of worn out plugs, but in many cases a little attention paid to the removal of carbon accumulations and the regapping or adjustment of the sparking points is all that is necessary. In practice it has been found that too little attention is given the spark plugs and disturbances they cause are placed against other parts. To assist in tracing ignition troubles to the source, and to give a positive indication of the condition and probable life of a given spark plug, it is here proposed to provide an instrument for checking spark plug action easily and quickly so that defects may be properly located and remedied without guesswork.

The nature and scope of the invention will be best appreciated from an inspection of the accompanying drawing when taken in connection with the following detail specification.

In the drawing:

Figure 1 is a view showing a multiple cylinder internal combustion engine and the testing apparatus being used therewith.

Figure 2 is a top plan view of the testing instrument with the parts broken away.

Figure 3 is a transverse cross section taken on line 3—3 of Figure 2.

Figure 4 is a side elevation with parts broken away; and Figure 5 is a diagrammatic representation of the wiring circuits involved.

There is shown in the drawing, an internal combustion engine 1 having a fuel feed control linkage 2 by which the speed of the engine is governed, and a conventional ignition system, including a spark plug 3, for each cylinder, connected by a lead wire or cable 4 with the usual distributor mechanism. The testing device 6 having a ground connection 7, is connected by the lead-in wire 8 with the terminal of the spark plug to be checked.

Referring specifically to the testing device 6, as shown in Figures 2, 3 and 4, there is involved a casing or box like housing 10, of bakelite, or other suitable insulating material, to support and enclose the parts by which a check is effected, and having on its underside a removable cover or lid 11. On its upper surface the casing 10 is provided with a depression to receive a manually movable control knob or pointer 12 and with a series of spaced bosses or markers 13 arranged in an arc about the axis of the knob 12. The knob 12 is keyed or fixed on the end of a shaft 14 extending through and having a pivot bearing in the wall of the casing. Engaging the shaft within the casing is a spring detent finger 9 secured to the casing by screws 15, which also serve as a connection for the ground wire 7, passing through an opening in the casing wall. At its lower end, the shaft carries a contact arm 16 for selective engagement near its end with a series of stations located in its path of travel in corresponding relation with the markers 13. Five of such markers and corresponding stations are embodied in the device illustrated, but a greater or lesser number may be employed.

The stations at 17, 18, 19 and 20 each involve a conducting element 23 formed of carbon or the like, having at its lower end a contact tip 24 for engagement by the selector arm 16. To resiliently urge the conducting element 23 downwardly for insuring a good electrical contact with the arm 16, use is made of a coil spring 25 interposed between the upper end of the conducting element and a contact member 26, associated with an arcuate conductor strip 27, common to the several stations and which may be constituted by joined sections extending from station to station. Each conducting element 23 differs in the amount of resistance it offers to current flow, and the predetermined resistances may be, for example, 300,000 ohms, 400,000 ohms, 500,000 ohms and 600,000 ohms, respectively.

At the station 21, which contains no conductance, a connection 28 is provided for the attachment of the conductor 27 with the lead-in wire 8 and a conductor 29 extends from this point laterally and downwardly into a pocket at the bottom of the casing for connection through a retainer coil spring 30 with a neon tube or other flasher device 31 seated within the pocket. A tapered observation opening 32 leads downwardly from the upper surface of the casing to the pocket.

To enable a better understanding of the use of the device, reference is made to the diagrammatic view of Figure 5. To use the equipment for making a test, the engine should be thoroughly warmed up and all testing should be done under actual engine running conditions. The ground wire 7 may be connected to any clean metallic part of the engine and the lead-in or high tension wire 8 with the terminal of one of the plugs to be tested without removing the spark plug cable 4.

With the engine idling as low as possible, and the knob set to station 21, the neon tube will flash every time the plug sparks. The operator should watch the action of the neon tube with the engine idling and then suddenly speed up the engine by operating the fuel feed control mechanism. At this time, particular notice should be taken as to whether or not the neon tube misses or dims. If it does, the plug will also miss in driving the car under similar conditions. Improper firing may be detected also by the trained ear without reference to the flasher. All of the plugs should be tested in the same fashion. If any of the plugs miss, they should be taken out, cleaned and re-gapped and then replaced for a further test. In the event any plug again misses, it should be replaced by a new one. If, however, the flashing is regular on either the first or second test, the pointer knob may be set at one of the other stations depending upon the particular make of engine, to close a shunt circuit having therein a resistance of a predetermined value. The action resulting simulates an equivalent leakage condition in the spark plug or ignition circuit. Therefore, when the test is repeated, the intensity of the flash will indicate the probable life of the plug and enable immediate replacement if it is in bad condition. The test can be carried further by varying the amount of conductance in the parallel circuit by changing the setting of the pointer knob to introduce one or more of the remaining resistance elements into the circuit.

The provision of the several fixed conductance elements enables the instrument to be used in checking the spark plugs on a wide range of different types of engines.

In any case, if the spark plug is good, the ignition coil will be able to supply the break-down voltage needed at the spark plug gap as well as the shunted energy flowing through the resistance; and the spark at the spark plug gap will cause a glow in the flashing device.

Wear of the electrodes or improper spacing will require a higher break-down voltage; carbon deposition and other combustion residual coating on the spark plug insulator will add another conductance in parallel, thereby diverting or shunting some, or all, of the energy that the ignition coil can deliver, so the combination of either a high break-down voltage or/and high leakage through the insulator coating in combination with the current shunted by the instrument will cause the plug to miss or fire intermittently and the action can be observed by noting the neon tube effect. By varying the resistance in the shunt circuit, and noting the effect produced, the exact condition and probable life of the plug can be determined.

I claim:

1. An instrument for testing the condition of a spark plug of an engine while the engine is running, including a conductor, a series of stations associated with the conductor, certain of said stations including conducting elements of given resistances each of a different order, a manually operated contact device selectively engageable with the said stations, means to insert in parallel with the spark plug ignition circuit the contact device and conductor, and a flash indicator associated with the parallel circuit provided by the contact device and conductor.

2. An instrument for testing the condition of a spark plug of an engine while the engine is running, including a conductor, a series of stations associated with the conductor, certain of said stations including conductance elements each of a different order, a manually operated contact device selectively engageable with the said stations, means to insert in parallel with the spark plug ignition circuit the contact device and conductor, and a flash indicator associated with the parallel circuit provided by the contact device and conductor.

3. An instrument for testing the condition of a spark plug while the engine is running, including a flash indicator adapted for insertion in parallel with the spark plug ignition circuit, and means to simulate current losses in the ignition circuit including a shunt circuit and means to vary current flow in the shunt.

4. Means for testing the operating condition of an engine spark plug while the engine is running, including an indicator for connection in parallel with the spark plug ignition circuit, and means to simulate current losses in the spark plug circuit, including a circuit adapted for selective connection in parallel with the ignition circuit, a conductance element of conducting material and having a predetermined resistance value, and means for optionally closing the circuit containing said conductance element.

5. Means for testing a spark plug while the engine is running, including means for diverting current flow from the spark plug, and a conductance element associated with said means and formed of conducting material and having a predetermined resistance so as to produce a spark plug action such as would occur under a given carboned condition of the plug.

6. Means for testing a spark plug while the engine is running, including a shunt circuit associated with the spark plug circuit and provided with a conductance element offering a constant resistance to current flow equivalent to that of a predetermined fouling conductance.

7. Means for testing a spark plug while the engine is running, including a shunt circuit for diverting current flow from the spark plug circuit and means to simulate fouling conditions by varying the conductance of the shunt circuit.

8. An instrument for testing the condition of a spark plug, including means to indicate the intensity of the spark, and a shunt embodying a conductance element having a value approaching that of the by-pass afforded by a given carboned condition at the inner end of the plug.

9. An instrument for testing spark plugs, including means to indicate the intensity of the spark, and means to shunt current flow from the spark gap embodying an element formed of conducting material and of a resistance approximating that of a given fouling conductance.

10. Means to test the operating condition of a spark plug while the engine is running, including a device to indicate the intensity of the spark across the plug electrodes, a conductance element having a resistance of preselected value and means to divert current through said element to decrease intensity of the spark.

11. Means to test the operating condition of a spark plug while the engine is running, including means embodying conductance of a predetermined resistance through which current may be diverted from the plug to lessen the intensity of the spark across the plug electrodes, and a device to indicate the decreased intensity of the spark.

12. Spark plug testing mechanism, including a shunt circuit for diverting current from the plug and through a conductance element having a given resistance so as to weaken the spark plug action, and a flasher device operable by the jump of current across the spark gap and by its intensity indicating in direct relation the strength of the spark.

13. An instrument for testing the condition of a spark plug, including a flasher actuated by the jump of current across the spark plug gap, and means to lessen the intensity of the flash, said means including a plurality of separate conductance elements adapted for independent insertion in shunt relation with the spark plug.

14. An instrument for testing engine spark plugs while the engine is running, including a casing, conductors leading to and from the casing, a flasher device carried by the casing and connected to the inlet conductor, a conductance element having an inherent resistance of a predetermined order and connected to one of said conductors, and a manually operable contact device associated with the other conductor and adapted to connect said conductors through said conductance element at will to lessen the intensity of flasher action.

15. Spark plug testing apparatus having a spark indicator and being characterized by a shunt circuit affording an uninterrupted closed path for current leakage and including a conductance element of a preselected resistance substantially corresponding to that of given carbon deposit on the plug.

16. Spark plug testing apparatus having a spark indicator and being characterized by a plurality of shunt circuits having resistances, each of a different order corresponding to conductances of various degrees of carbon deposits on the plug, and manually controlled means to selectively close said circuits.

HECTOR RABEZZANA.